United States Patent
Varrassi et al.

(10) Patent No.: US 12,055,270 B2
(45) Date of Patent: Aug. 6, 2024

(54) DEVICE FOR STORING AND TRANSPORTING LIQUEFIED GAS

(71) Applicants: CRYOLOR, Ennery (FR); L'Air Liquide, Société Anonyme pour l'Etude et l'Exploitation des Procédés Georges Claude, Paris (FR)

(72) Inventors: Lucien Varrassi, Porcelette (FR); David Faisandier, Sassenage (FR)

(73) Assignee: L'Air Liquide, Société Anonyme Pour L'Etude Et L'Exploitation Des Procedes Georges Claude, Paris (FR)

(*) Notice: Subject to any disclaimer, the term of this patent is extended or adjusted under 35 U.S.C. 154(b) by 67 days.

(21) Appl. No.: 17/845,256

(22) Filed: Jun. 21, 2022

(65) Prior Publication Data
US 2022/0403981 A1 Dec. 22, 2022

(30) Foreign Application Priority Data
Jun. 22, 2021 (FR) ...................................... 2106608

(51) Int. Cl.
*F17C 3/08* (2006.01)

(52) U.S. Cl.
CPC .......... *F17C 3/08* (2013.01); *F17C 2203/015* (2013.01); *F17C 2203/0391* (2013.01); *F17C 2203/0629* (2013.01); *F17C 2209/228* (2013.01); *F17C 2223/0153* (2013.01)

(58) Field of Classification Search
CPC ................. F17C 1/12; F17C 2203/015; F17C 2203/0629; F17C 3/08; F17C 3/02
See application file for complete search history.

(56) References Cited

U.S. PATENT DOCUMENTS

| | | | |
|---|---|---|---|
| 2,467,428 A * | 4/1949 | Hansen | F17C 13/086 220/592.27 |
| 2,926,810 A | 3/1960 | Yeager | |
| 4,300,354 A * | 11/1981 | Buchs | F17C 13/086 220/592.27 |
| 2021/0296619 A1 | 9/2021 | Wang et al. | |

FOREIGN PATENT DOCUMENTS

| | | |
|---|---|---|
| JP | S61 248403 | 11/1986 |
| WO | WO 2019 010981 | 2/2018 |

OTHER PUBLICATIONS

French Search Report for corresponding FR 2106608, Feb. 10, 2022.

* cited by examiner

*Primary Examiner* — Stephen J Castellano
(74) *Attorney, Agent, or Firm* — Elwood L. Haynes

(57) ABSTRACT

A device for storing and transporting liquefied gas, including a first inner reservoir extending in a longitudinal direction, a second outer reservoir, the device having a system for holding the first reservoir in the second reservoir having a first rigid connection between the first reservoir) and the second reservoir at a first longitudinal end, and, at a second longitudinal end of the device, a mechanism for suspending the first reservoir inside the second reservoir having an assembly of tie rods, a first end of the tie rods being attached to a sheath that is secured to the first reservoir via a washer(s) and nut assembly, these being fitted around the tie rod, a second end of the tie rods being attached to a sheath that is secured to the second reservoir via a washer(s) and nut assembly.

7 Claims, 5 Drawing Sheets

DEVICE FOR STORING AND TRANSPORTING LIQUEFIED GAS

CROSS REFERENCE TO RELATED APPLICATIONS

This application claims the benefit of priority under 35 U.S.C. § 119 (a) and (b) to French Patent Application No. 2106608, filed Jun. 22, 2021 the entire contents of which are incorporated herein by reference.

BACKGROUND

The invention relates to a device for storing and transporting liquefied gas, in particular cryogenic fluid such as helium or hydrogen.

The invention relates more particularly to a device for storing and transporting liquefied gas, in particular cryogenic fluid such as helium or hydrogen, comprising a first inner reservoir extending in a longitudinal direction and intended for storing the liquefied gas, a second outer reservoir arranged around the first reservoir with a vacuum-insulated space between the first reservoir and the second reservoir, the device comprising a system for holding the first reservoir in the second reservoir, said holding system comprising a first rigid connection, for example a welded connection, between the first reservoir and the second reservoir at a first longitudinal end of the device, and, at a second longitudinal end of the device, a mechanism for suspending the first reservoir inside the second reservoir, the suspension mechanism comprising an assembly of tie rods connecting the first reservoir to the second reservoir via sheaths that are rigidly attached respectively to the first reservoir and to the second reservoir, a first end of the tie rods being attached to a sheath that is secured to the first reservoir via a washer(s) and nut assembly, these being fitted around the tie rod, a second end of the tie rods being attached to a sheath that is secured to the second reservoir via a washer(s) and nut assembly, these being fitted around the tie rod, each nut being screwed onto one end of the tie rod and clamping the assembly of washer(s) against the sheath, the tie rods being inclined with respect to an axis perpendicular to the longitudinal direction, the device comprising a mechanism for adjusting the position of at least one end of a tie rod relative to its sheath(s) before the tie rod is rigidly attached to the sheath.

The invention relates in particular to horizontal reservoirs or containers (in particular ISO containers) that are fixed or mobile (for example transported by lorry) for transporting fluids (in particular cryogenic liquids or gases).

During manufacture of such a device, adjustment of the connecting elements (suspension) must be carried out hot (when the reservoir is not filled) and precisely prior to welding so as to not promote ingress of heat which would impair the thermal performance of the product.

In known devices, adjustment of the final orientations and positions of the tie rods for suspending the inner reservoir is awkward. In certain cases, welding of a first longitudinal end of the reservoirs can for example give rise to harmful contact between the tie rods and their sheath at the other longitudinal end (second end). Additional contractions are generated when the reservoir is cooled. These contractions may vary depending on the parameters of the welding of the assembled parts.

SUMMARY

One aim of the present invention is to overcome all or some of the drawbacks of the prior art assembly out above.

To that end, the device according to the invention, which is otherwise according to the generic definition thereof given in the above preamble, is essentially characterized in that the adjusting mechanism comprises at least one among: a spherical joint in which the assembly of washer(s) of at least one end of a tie rod has a thickness that is not uniform in a direction parallel to the axis of the tie rod thus forming a non-planar bearing surface and constituting the spherical joint that allows, by rotational positioning of the assembly of washers) around the tie rod, a given angular orientation of the tie rod with respect to the sheath and before the tie rod is rigidly attached to the sheath in said orientation, a positioning system in which at least one end of the sheath that is in contact with an assembly of washer(s) and said assembly of washer(s) have mating shapes that are configured to permit transverse positioning of the assembly of washer(s), of the tie rod and of the nut with respect to the sheath in a given position with respect to the sheath during fitting of the assembly and before the tie rod is rigidly attached to the sheath in said orientation.

In the examples shown, the two ends of the tie rods are respectively attached to the two reservoirs via this system of sheath(s), washer(s) and nut. However, only one of the ends of the tie rods can be attached in this manner to its reservoir.

Thus, at least one of the ends of at least one heart of the tie rods can be attached to its reservoir (first or second reservoir) via a sheath that is secured to said reservoir and a washer(s) and nut(s) assembly, these being fitted around the tie rod and providing positioning and holding of the end of the tie rod with respect to the reservoir.

The connecting system with sheath, washers and nut allows the tie rod to be positioned in a given manner (angular position of the tie rod) before it is rigidly attached, for example by welding (fixed angular position).

Furthermore, embodiments of the invention may comprise one or more of the following features:

- the assembly of washer(s), the tie rod and the nut belonging to the positioning system can be positioned transversely over a distance of several millimetres with respect to the sheath,
- mating shapes of the positioning system are formed respectively at the end of the sheath that is in contact with the assembly of washers) and at the assembly of washer(s), the mating shapes comprising at least one notch and at least one complementary protrusion that is received in the notch, the notch and the protrusion being configured so as to guide the movement of the assembly of washer(s), the tie rod and the nut transversely with respect to the sheath,
- the assembly of washer(s) comprises two washers superposed between the nut and the sheath,
- the washer(s) are made of at least one of the materials among: austenitic stainless steel, duplex stainless steel, ferritic stainless steel, or epoxy laminate,
- the first end of the tie rods is attached to a sheath secured to a collar secured to an end of the first reservoir,
- the assembly of tie rods comprises four, six or eight tie rods,
- the rotational positioning of the assembly of washer(s) around the tie rod of the spherical joint is configured to modify, by a few degrees, the angular orientation of the tie rod with respect to the sheath.

The invention can also relate to any alternative device or method comprising any combination of the features above or below within the scope of the claims.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
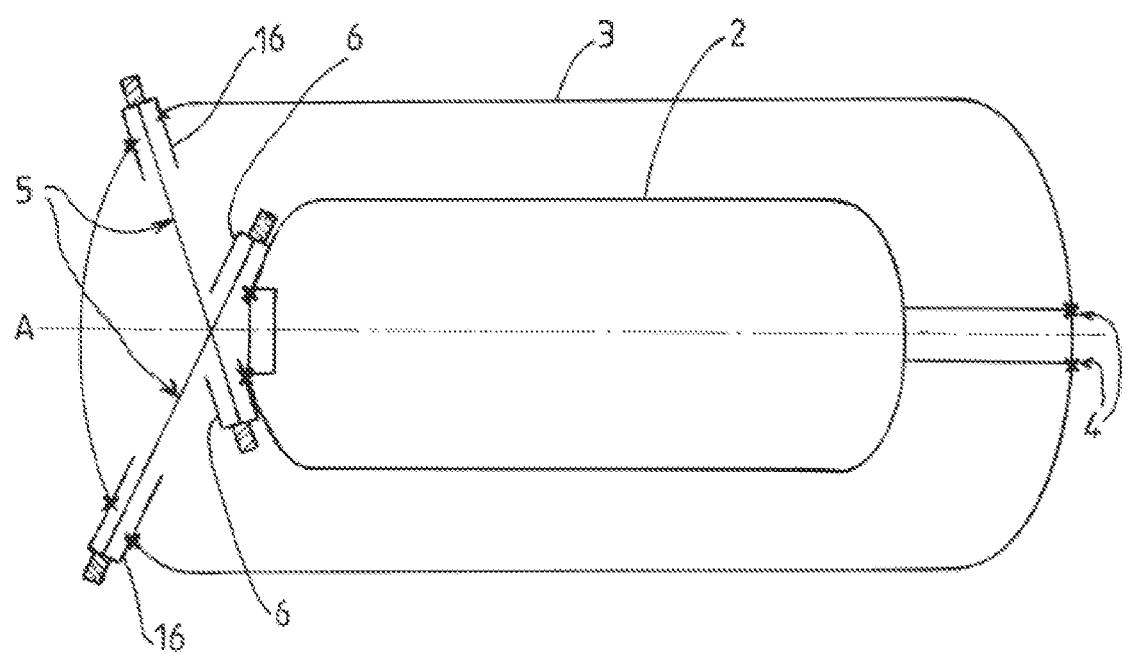
FIG. 1 shows a schematic, partial view in longitudinal section, illustrating an example of the structure of the device according the invention.

The illustrated device 1 for storing and transporting liquefied gas comprises a first, inner reservoir 2, for example generally cylindrical in shape, that extends along a longitudinal direction A. This longitudinal direction A is horizontal in the use position (reservoir of the horizontal type).

This first, inner reservoir 2 is intended to store the liquefied gas.

A second, outer reservoir 3 is disposed around the first reservoir 2 with a vacuum-insulated space between the first reservoir 2 and the second reservoir 3.

The device 1 comprising a system for holding the first reservoir 2 in the second reservoir 3. This holding system comprises a first rigid connection 4, for example a welded connection, between the first reservoir 2 and the second reservoir 3 at a first longitudinal end of the device 1. For example, the two adjacent ends are welded 4 by means of a tubular part such as a collar.

At a second longitudinal end of the device 1, the device comprises a mechanism for suspending the first reservoir 2 inside the second reservoir 3.

This suspension mechanism comprises an assembly of tie rods 5 connecting the first reservoir 2 to the second reservoir 3 via sheaths 6, 16 rigidly attached respectively to the first reservoir 2 and/or to the second reservoir 3. That is to say that, in the final rigid attachment position (for example when welded), the tie rods are fixed in a given position (inclination) with respect to the reservoirs.

For example, the device 1 comprises multiple tie rods 5 whose two ends are connected to one of the reservoirs via sheaths 6, 16.

A first end of the tie rods 5 is attached to a sheath 6 secured to the first reservoir 2 via an assembly consisting of washer(s) 7, 8 and a nut 9 that are fitted around the tie rod 5. The sheath 6 is a tubular part which is for example welded to a cylindrical collar 13 that is secured to the second longitudinal end of the first reservoir 2. For example, the collar 13 is welded to the end of the first reservoir 2.

The second end of the tie rods 5 is attached to a sheath 16 secured to the second reservoir 3 (for example the sheath 16 is welded to the reservoir) via an assembly consisting of washer(s) 7, 8 and a nut 9 that are fitted around the tie rod 5.

Each nut 9 may be screwed onto a threaded end of the tie rod 5 so as to clamp the assembly of washer(s) 7, 8 against the sheath 6.

The tie rods 5 are inclined with respect to an axis perpendicular to the longitudinal direction.

According to one advantageous feature, the device 1 comprises a mechanism by which it is possible to adjust the position of at least one end of a tie rod 5 relative to its sheath(s) 6, 16 before the tie rod 5 is rigidly attached to the sheath 6, 16.

This adjustment mechanism comprises a spherical joint and/or a positioning system.

Figure 2:
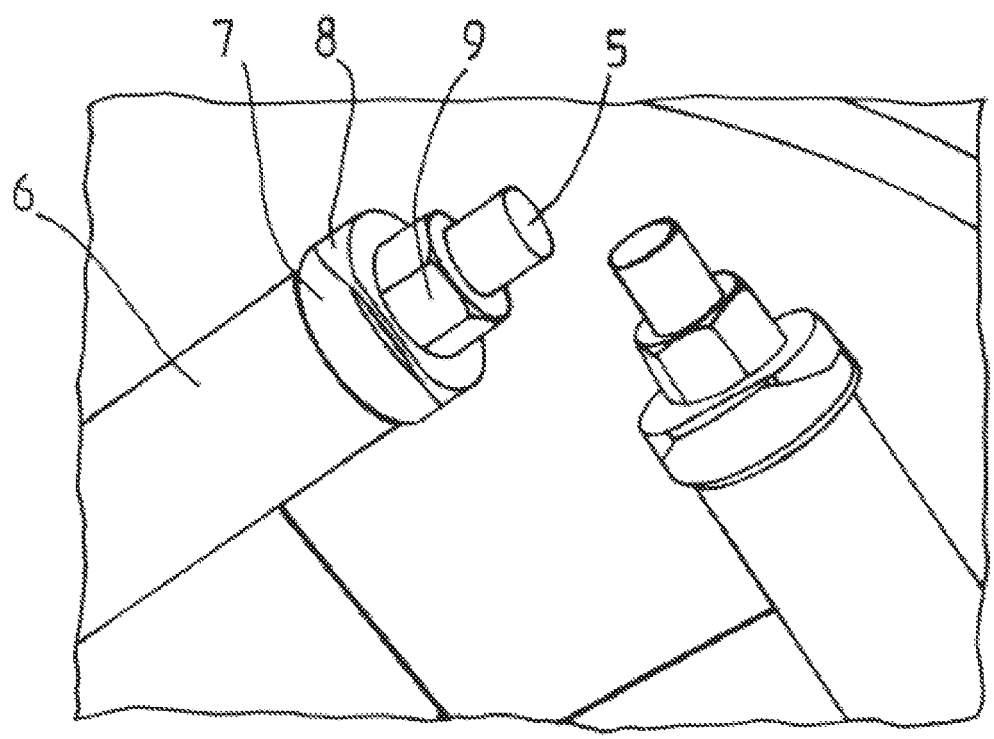
FIG. 2 shows a schematic, partial perspective view, illustrating a detail of the device and in particular at an end of suspension tie rods.
Figure 3:
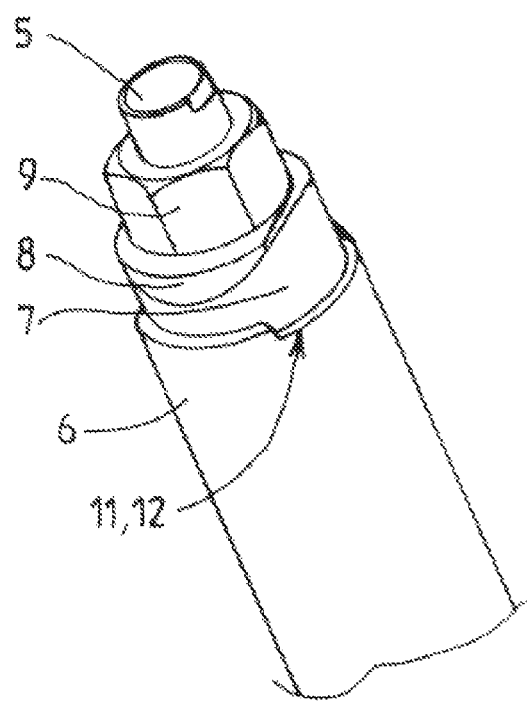
FIG. 3 shows another schematic, partial perspective view, illustrating a detail of the device and in particular at an end of a suspension tie rod.

As shown in FIG. 2 or in FIG. 3, the spherical joint may be formed by at least one washer 8 of the assembly of washer(s) 7, 8 of at least one end of a tie rod 5 having a non-uniform thickness measured in the direction of the axis of the tie rod 5. This non-uniform thickness forms a non-planar bearing surface constituting a spherical joint at the joint and thus allows, by rotational positioning of the washer 7 in a positioning groove, angular orientation of the tie rod 5 with respect to the sheath 6. This permits fine adjustment of the given orientation of the tie rod 5 during fitting of the assembly and before the tie rod 5 is rigidly attached (welded) to the sheath 6 in said orientation. After positioning, the final position of the tie rods is fixed by welding of the washer 7 onto the sheath 16.

In this non-limiting example the assembly of washer(s) 7, 8 comprises two washers superposed between the nut 9 and the sheath 6. The washer(s) 7, 8 may be made of at least one of the materials among: austenitic stainless steel, duplex stainless steel, ferritic stainless steel, or epoxy laminate.

The positioning system may be formed as follows: At at least one end of a tie rod 5, the end of the sheath 6 that is in contact with the assembly of washer(s) 7, 8 and said assembly of washer(s) 7, 8 preferably have meeting shapes 11, 12 that are configured to permit transverse positioning of the assembly of washer(s) 7, 8, of the tie rod 5 and of the nut 9 with respect to the sheath 6. This positioning (which can vary for example by a few millimetres) makes it possible to choose a given position of the tie rod 5 with respect to the sheath 6 when fitting the assembly and before rigid attachment (welding) in said orientation. In particular, this positioning system makes it possible to adjust (before fixing) the angular position of the tie rods.

This permits alternative or additional adjustment of the suspension mechanism in order to adjust the longitudinal position of the tie rods, in particular with respect to the outer reservoir 3.

This makes it possible to adjust the angle and/or the position of the tie rods 5 in question.

Figure 5:
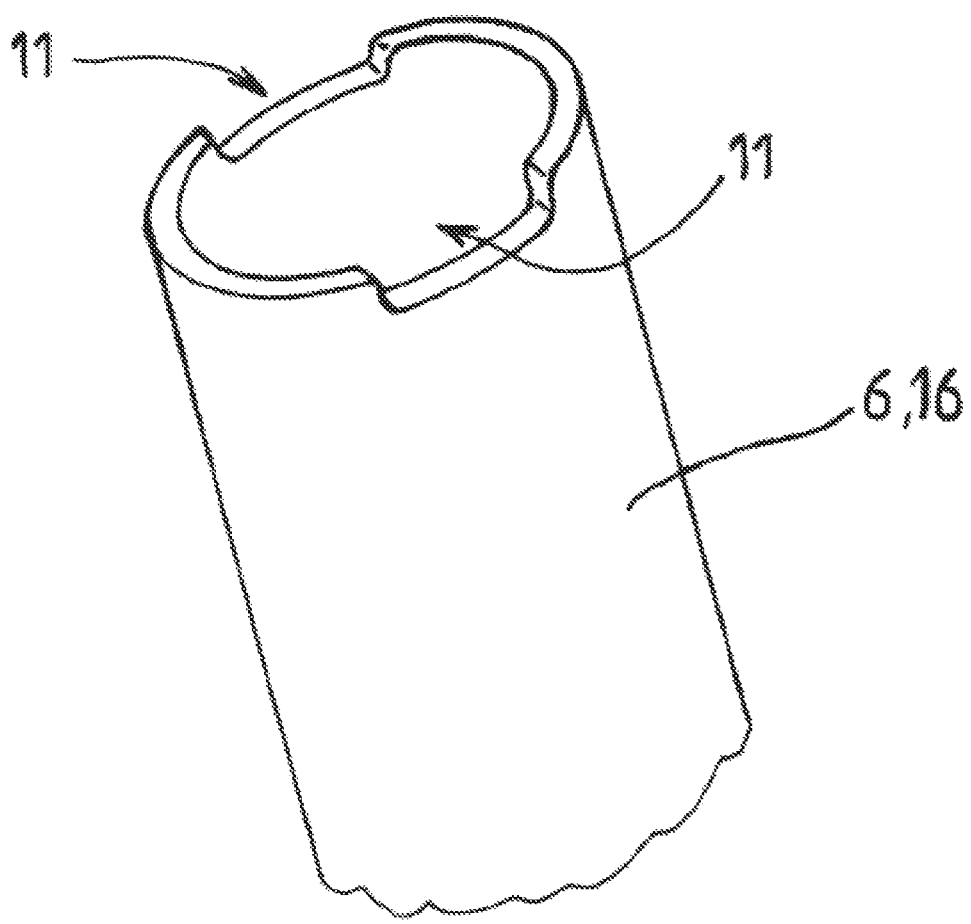
FIG. 5 shows another schematic, partial perspective view, illustrating a detail of the device and in particular an end of a sheath intended to receive a suspension tie rod.

One example of mating shapes 11, 12 is illustrated in FIG. 3 and in FIG. 5. These mating shapes are located respectively at the end of the sheath 6 in contact with a washer 7 and at this washer 7. As shown, these mating shapes may comprise at least one notch 11 (or cutout or groove), (for example at the sheath 6) and at least one complementary protrusion 12 (for example at the washer 7) that is received in the notch 11. As illustrated in FIG. 5, the end of the sheath 6, 16 may in particular have two notches 11 that are located diametrically opposite on the end edge of the sheath 6, 16. This forms a system for guiding along the direction passing through the two notches 11.

The notches 11 and protrusions 12 are configured to guide the movement of the assembly of washer(s) 7, 8, the tie rod 5 and the nut 9, transversely with respect to the sheath 6 and in particular along the longitudinal direction A. This also makes it possible to choose the appropriate angle of inclination after welding 4 at the first end of the device, then to weld this second end in this appropriate position.

Figure 4:
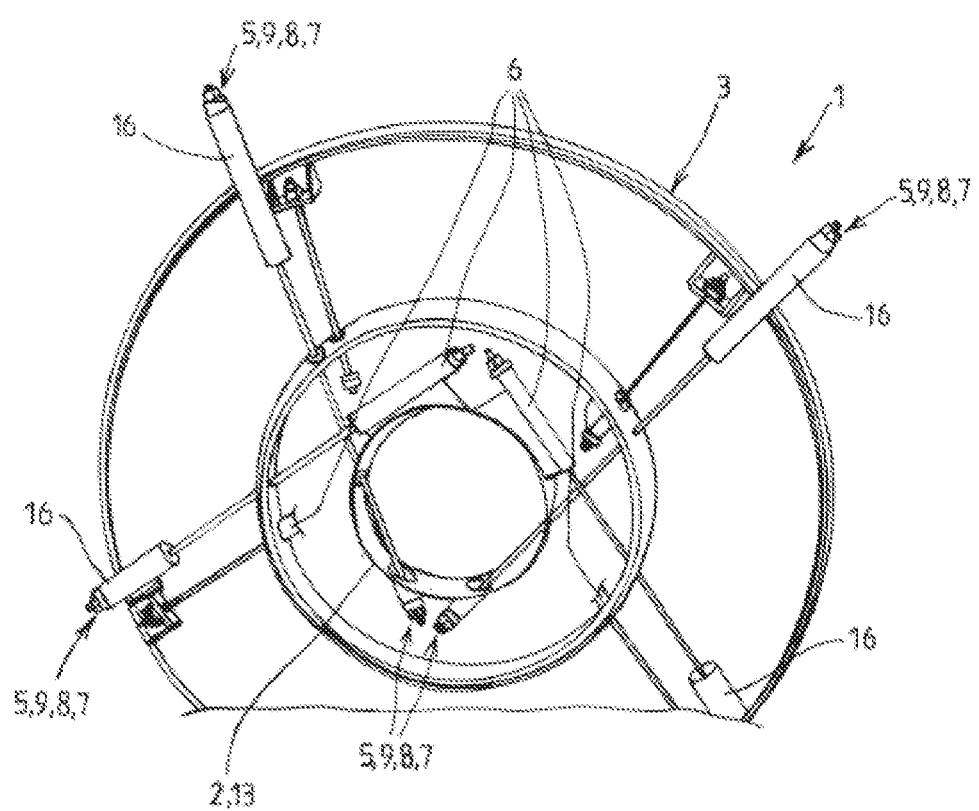
FIG. 4 shows another schematic, partial front view, illustrating a detail of a longitudinal end of the device.

Of course, alternatively or in addition, the suspension mechanism may comprise tie rods of which only one end is connected to a reservoir via a sheath (see FIG. 4).

In the example of FIG. 4, the suspension mechanism comprises four tie rods 5 whose two ends are respectively connected to the two reservoirs via sheaths 6, 16. These four tie rods 5 are for example distributed in the following manner: one pair in the upper part and another pair in the lower part (for example with an angle of less than 90 degrees between the two tie rods of a pair, in a plane transverse to the longitudinal direction, and an angle of greater than 90 degrees between the two adjacent tie rods 5 of the two pairs).

In this non-limiting example, four additional tie rods (not referenced) can be provided for the purpose of holding a heat shield (not depicted in detail for the sake of simplicity) and have one end connected to the screen via sheaths and another end connected to the outer reservoir 3 without a sheath. The tie rods for suspending such a heat shield interposed between the two reservoirs 2, 3 may also have an adjustment mechanism as described above.

The above-described adjustment mechanism may therefore apply to one or more tie rods and to an (inner/outer) end, or both ends, of the tie rod(s) 5. Equally, the number and orientation of the tie rods 5 is non-limiting.

Of course, the invention is not restricted to the example described hereinabove. For example, the second, outer reservoir 3 may enclose more than one reservoir for cryogenic fluid and/or other components, and in particular a heat shield interposed between two reservoirs.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A device for storing and transporting liquefied gas, comprising;
    a first inner reservoir extending in a longitudinal direction and configured to store a liquefied gas,
    a second outer reservoir arranged around the first inner reserve with a vacuum-insulated space between the first inner reservoir and the second outer reservoir,
    a system for holding the first inner reservoir in the second outer reservoir, said holding system comprising:
        a first rigid connection between the first inner reservoir and the second outer reservoir at a first longitudinal end of the device, and,
        at a second longitudinal end of the device, a suspension mechanism for suspending the first inner reservoir inside the second outer reservoir, the suspension mechanism comprising an assembly of tie rods connecting the first inner reservoir to the second outer reservoir via sheaths that are rigidly attached to the first inner reservoir and/or to the second outer reservoir, a first end and/or a second end of the tie rods being attached to a sheath that is secured to the first inner reservoir or the second outer reservoir via a washer(s) and nut assembly, these being fitted around the tie rod, each nut being screwed onto one end of the tie rod and clamping the assembly of washer(s) against the sheath, the tie rods being inclined with respect to an axis perpendicular to the longitudinal direction,
    a mechanism for adjusting the position of at least one end of a tie rod relative to its sheath(s) before the tie rod is rigidly attached to the sheath, wherein the adjusting mechanism comprises at least one among: a spherical joint in which the assembly of washer(s) of at least one end of a tie rod has a thickness that is not uniform in a direction parallel to the axis of the tie rod thus forming a non-planar bearing surface and constituting the spherical joint that allows, by rotational positioning of the assembly of washer(s) around the tie rod, a given angular orientation of the tie rod with respect to the sheath and before the tie rod is rigidly attached to the sheath in said orientation, a positioning system in which at least one end of the sheath that is in contact with an assembly of washer(s) and said assembly of washer(s) have mating shapes that are configured to permit transverse positioning of the assembly of washer(s), of the tie rod and of the nut with respect to the sheath in a given position with respect to the sheath during fitting of the assembly and before the tie rod is rigidly attached to the sheath in said orientation,
    wherein the mating shapes of the positioning system are formed respectively at the end of the sheath that is in contact with the assembly of washer(s) and at the assembly of washer(s), the mating shapes comprising at least one notch and at least one complementary protrusion that is received in the notch, the notch and the protrusion being configured so as to guide the movement of the assembly of washer(s), the tie rod and the nut transversely with respect to the sheath.

2. The device according to claim 1, wherein the assembly of washer(s), the tie rod and the nut belonging to the positioning system can be positioned transversely over a distance of several millimetres with respect to the sheath.

3. The device according to claim 1, wherein the assembly of washer(s) comprises two washers superposed between the nut and the sheath.

4. The device according to claim 3, wherein the washer(s) are made of at least one of the materials among: austenitic stainless steel, duplex stainless steel, ferritic stainless steel, and epoxy laminate.

5. The device according to claim 1, wherein the first end of the tie rods is attached to a sheath secured to a collar secured to an end of the first reservoir.

6. The device according to claim 1, wherein the assembly of tie rods comprises four, six or eight tie rods.

7. The device according to claim 1, wherein the adjusting mechanism comprises the positioning system in which the rotational positioning of the assembly of washer(s) around the tie rod of the spherical joint is configured to modify, by a few degrees, the angular orientation of the tie rod with respect to the sheath before the tie rod is rigidly attached with respect to the sheath.

* * * * *